United States Patent [19]

Trendel

[11] Patent Number: 4,708,235
[45] Date of Patent: Nov. 24, 1987

[54] CLOSURE HANDLING APPARATUS

[75] Inventor: Alois F. Trendel, Temperance, Mich.

[73] Assignee: Owens-Illinois Closure Inc., Toledo, Ohio

[21] Appl. No.: 736,603

[22] Filed: May 21, 1985

[51] Int. Cl.⁴ .............................................. B65G 47/12
[52] U.S. Cl. ................................................... 198/454
[58] Field of Search ................ 198/533, 493, 453–455, 198/448, 347, 399; 221/200, 201, 204, 205; 406/76, 86, 88, 134, 137; 222/198

[56] References Cited

U.S. PATENT DOCUMENTS

| 1,012,106 | 12/1911 | Seavey | 221/204 |
| 1,852,392 | 4/1932 | Axelson et al. | 221/204 |
| 3,305,128 | 2/1967 | Dearsley | 198/533 |
| 3,749,280 | 7/1973 | Gale | 221/200 |
| 4,006,812 | 2/1977 | Everett et al. | 198/347 |
| 4,111,295 | 9/1978 | Rutherford | 198/399 |
| 4,253,783 | 3/1981 | Lenhart | 406/86 |
| 4,302,134 | 11/1981 | Johnson, Jr. et al. | 198/493 |
| 4,567,978 | 2/1986 | Hartness | 198/454 |

Primary Examiner—Joseph E. Valenza
Attorney, Agent, or Firm—H. G. Bruss

[57] ABSTRACT

An accumulator for collecting the outputs of a plurality of sorters in a single layer of oriented closures in a hopper and feeding the closures in single file to a downstream operation station. Bridging patterns of closures in the layer which interrupt flow to the next station are displaced by regulating the internal configuration of the hopper, agitating the layer of closures, conveying closures from the bottom of the layer to the discharge chute, and by impinging the closures with air jets to break up the patterns and urge the closures to the discharge chute.

23 Claims, 7 Drawing Figures

CLOSURE HANDLING APPARATUS

BACKGROUND OF THE INVENTION

1. Field of the Invention

This invention generally relates to closure handling, sorting and feeding apparatus and, more particularly, to apparatus for orienting and feeding large numbers of closures to high speed utilization stations such as cappers.

2. Description of the Prior Art.

High speed sorting devices have been desirable in the closure industry. Typically they involved utilizing the dimensional characteristics of the article to arrange them in an orderly manner so that they can be segregated in a common orientation.

Devices employing rotating starwheels or pinwheels to reorient closures or container caps have been employed in the past. These services, however, are relatively limited in speed. Moreover, some types of caps such as the closure disclosed in U.S. Pat. No. 4,033,472 to OBRIST have a fragile tamper-proof band which cannot withstand the force exerted by such mechanical sorters.

In response to the need for sorters which exert less mechanically damaging forces on the closures, devices using air sensors have been developed. See, for example, U.S. Pat. No. 3,526,310 to TESSMER in which an air sensor detects the orientation of a cap and produces a signal to control an air pulse which reorients improperly positioned caps.

Other devices using non-contact sensing have also been developed which have served their particular purpose well. However, the development of such sorters in the speed ranges required for more recent developments in the newer packaging and application stations has not kept pace.

SUMMARY OF THE INVENTION

Apparatus for improving the process of supplying closures in a predetermined oriented position to a successive packaging or application station, in accordance with the teachings of this invention, includes an accumulator having a hopper for receiving oriented closures from a plurality of sorters. Enclosing front and back panels of the hopper are spaced to maintain the closures in a single layer to preserve their desired orientation.

The bottom wall of the hopper has first and second sections that are inclined toward and on opposite sides of a discharge chute for the closures to the next station. The discharge chute is remotely located from the infeed chutes at the top of the hopper.

Gravity acting on the closures normally pulls them down from the infeed chutes and out through the discharge chute. However, a number of disrupting influences may interrupt the flow of closures through the hopper.

One such major cause of flow interruption is the formation of a regular stacking pattern of the single layer of closures within the hopper, which sometimes gives a honeycomb appearance and distributes the pull of gravity on adjacent contacting side walls of closures and on the hopper walls so that a unitary self-supporting structure results. Therefore, flow of the closures to the discharge chute is prevented and a bridging over the discharge chute occurs.

This tendency to form bridging patterns may be encouraged by knurling on the outside side walls of the closures, magnetic fields in metal closures, static attraction between plastic closures, and the like.

To reduce the bridging tendencies different means are provided to displace the closures from forming such a regular or bridging pattern. Each of the approaches is operable by itself, but are more effective when all are included—particularly when a variety of closure types may be collected by the accumulator. Certain types of closures may be successfully processed by using less than all of the bridging disruption techniques disclosed.

First, the interior of the hopper may be configured to prevent geometries that are more likely to result in natural bridging patterns. The bottom wall is formed in two sections which are inclined toward and separated by the discharge chute. With most closures the degree of inclination should not be less than twenty degrees from the horizontal. Further, the inclination approach is more effective if one bottom wall section is inclined more than the other section, preferably about ten degrees more.

To further change the interior configuration, a pattern modifying block may be removably secured to the bottom wall. Since the block may be easily removed and another substituted, this can be used as a fine-tuning approach. Alternatively, it may be desirable to have a pattern modifying block that has dimensions that are particularly suited to preventing bridging patterns with each type of closure to be collected in the hopper. Thus, when a different closure is processed the most suitable block is used to modify the interior configuration for the new closure.

Secondly, apparatus may be used to agitate the layer of closures to break up bridging patterns. In conjunction with or as an alternative to agitation, means may be used which effectively conveys closures from the bottom of the single layer to the discharge chute.

Thirdly, air jets may be used to impinge the closures to break up bridging patterns and/or urge the closures toward and into the discharge chute.

Finally, sensing means is used to monitor the feeding of closures to the hopper to generate a signal for controlling the rate of feed, the level of closures in the hopper and/or operation of the upstream sorters.

The object of this invention, therefore, is to provide an improved method and apparatus for feeding oriented closures to an operating station whose input feed requirements exceed the supply capabilities of individual sorting stations upstream of the operating station. The invention also allows a plurality of sorters to be operated at slower speeds to reduce mechanical damage to both the closures and the sorters.

Other objects and advantages of the invention will become more apparent during the course of the following description when read in conjunction with the accompanying drawings.

BRIEF DESCRIPTION OF THE DRAWINGS

In the drawings, where like numerals are employed to designate like parts throughout.

Figure 1:
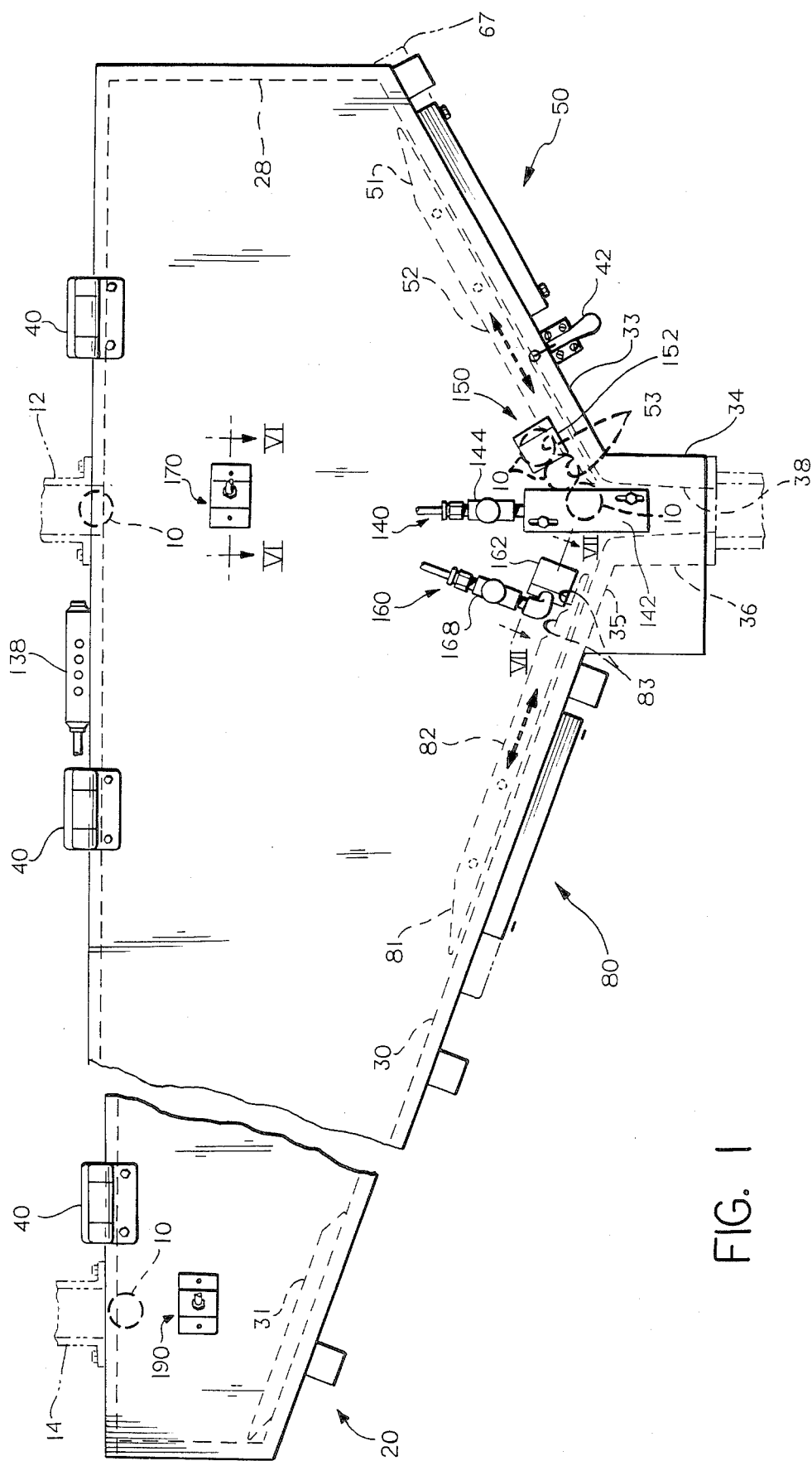
FIG. 1 is a front elevational view of an accumulator device embodying the teachings of this invention.
Figure 3:
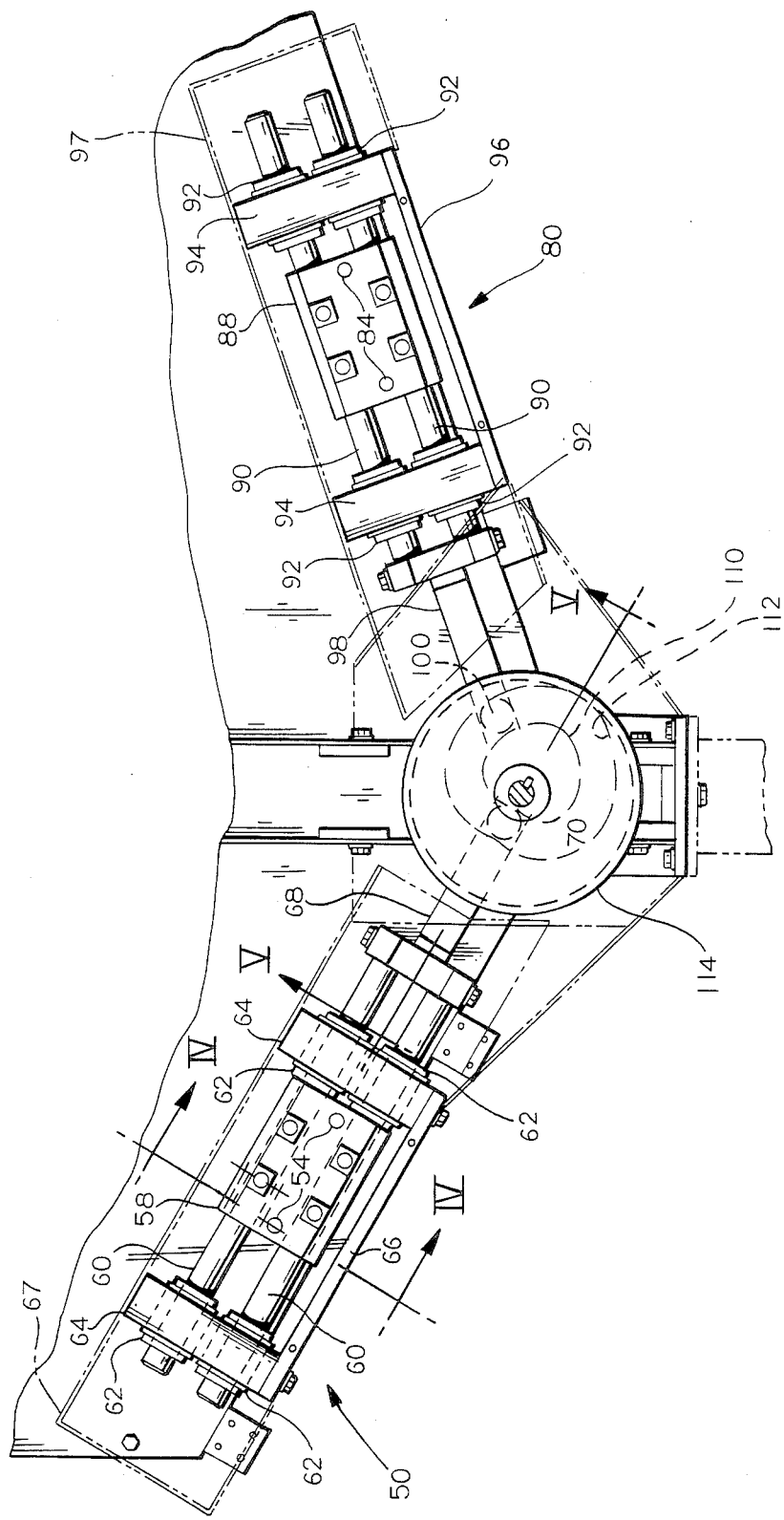
FIG. 3 is an enlarged rear view of the agitating apparatus utilized in the embodiment shown in FIGS. 1 and 2.
Figure 4:
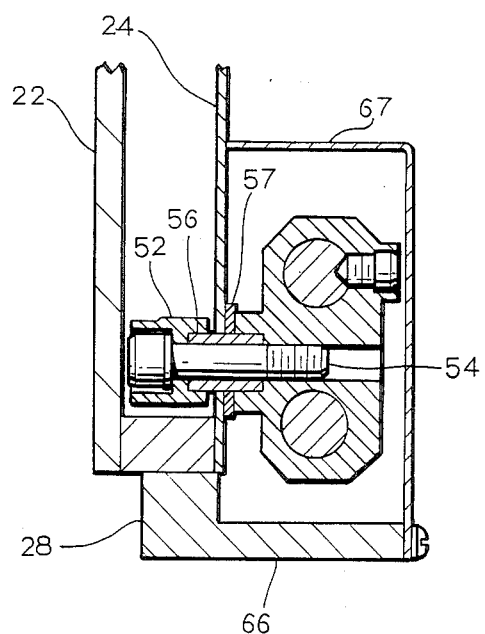
Figure 5:
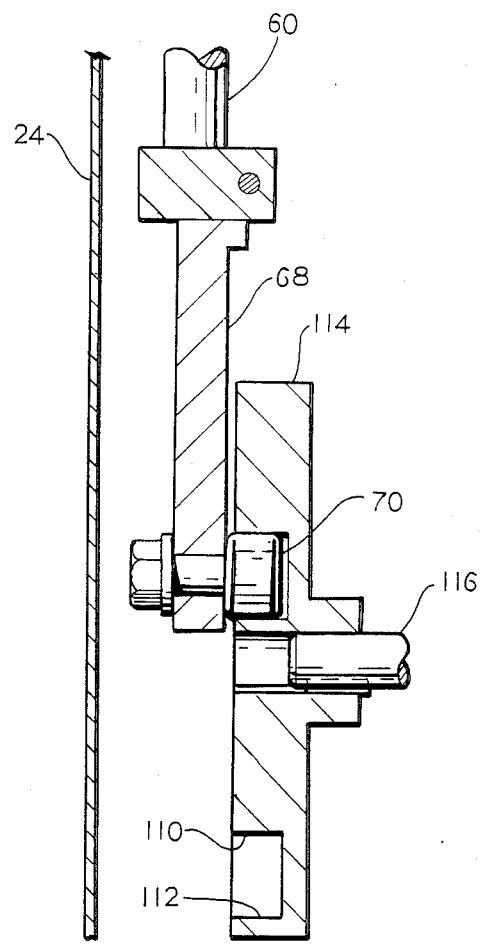
Figure 6:
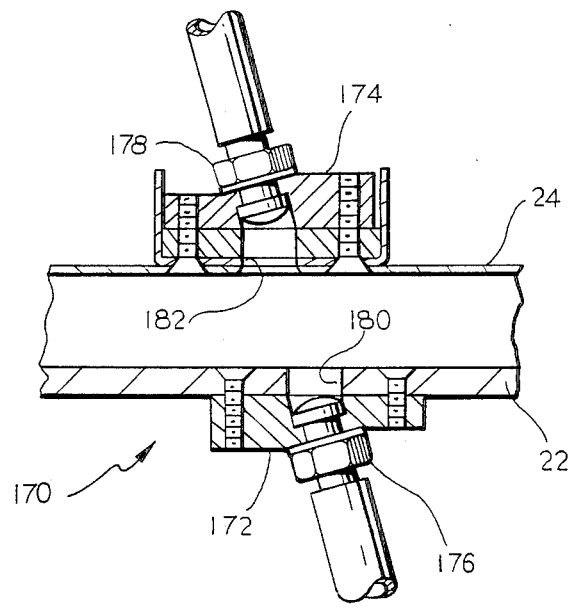

of FIG. 4 is a sectional view taken substantially along line IV—IV of FIG. 3;

FIG. 5 is a sectional view taken substantially along line V—V of FIG. 3;

FIG. 6 is a sectional view taken substantially along line VI—VI of FIG. 1; and

Figure 7:
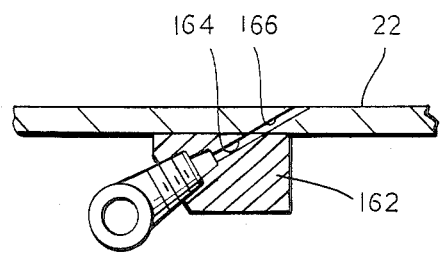

FIG. 7 is a sectional view taken substantially along line VII—VII of FIG. 1.

DESCRIPTION OF THE PREFERRED EMBODIMENT

As illustrated in FIG. 1; in a preferred embodiment of the invention, a plurality of closure discriminator means or sorters (not shown) feed closures 10 through chutes 12 and 14 to an accumulator apparatus indicated generally at 20. The closures have been oriented by the sorters so that they are all facing in the same direction. That is, the major exterior planar dimension of each of the closures is oriented so that it is located against a reference surface. In this instance the reference surface may be the front cover or panel 22 or the back panel 24 of a hopper 26. For best operation in the embodiment disclosed, the open ends of the closures are oriented toward front cover 22.

The hopper 26 includes the front and back panels 22, 24 held in a spaced relationship to maintain closures 10 in their oriented position (best seen in FIG. 2) by a right hand side bar 28, a left hand side bar 30, and a top cover 32. The bottom ends of side bars 28, 30 are inclined at 33, 35, downwardly directed at 34, 36, and spaced apart to form in combination with front and back panels 22, 24 a discharge chute 38 for the closures exiting from the accumulator apparatus 20.

The front panel 22 is preferably formed from a sheet of clear plastic, so that the operation of the apparatus and the loading of and positions of the closures in the hopper 26 can be observed without removing or opening the panel. Hinge devices 40 connect front panel 22 to top cover 32 so that panel 22 can be pivoted open to permit access to the interior of the hopper 26.

A plurality of toggle clamps means 42 may be used to secure the front cover 22 in a closed position adjacent the right and left hand side bars 28, 30.

Along the bottom of the hopper 26 on each side of the discharge chute 38, there is disposed a right hand agitating mechanism 50 and a left hand agitating mechanism 80.

Right and left hand agitator slide bars 52, 82 are respectively supported for reciprocable motion back and forth along the inclined bottoms of the hopper 26 by bolts 54, 84 extending through slots (such as shown at 56 in FIG. 4) formed in the back panel 24. Seal strips, such as shown at 57 in FIG. 4, may be used to isolate the slide bar connectors from the back panel 24, and to prevent dirt and dust from entering the reciprocating mechanism area from the hopper. The bolts 54, 84 extend from slide bar connectors 58, 88 carried on shafts 60, 90. The shafts are slidably mounted in bushings or bearings 62, 92 held by retainers 64, 94, which are attached to rearwardly extending flanges 66, 96 of the side bars 28, 30. (See FIGS. 3 and 4). Guards 67, 97 enclose the portions of the agitator mechanisms outside of the hopper 26.

The agitating apparatus 50, 80 further respectively includes shaft clamps 68, 98 which connect shafts 60, 90 to right and left cam followers 70, 100 riding on inner cam surface 110 and outer cam surface 112 formed in a rotatable cam block 114. The cam block 114 is mounted on an output shaft 116 of a gear box 118 driven by a motor 120 (See FIG. 2).

Bracket means 130 and stanchion means 132, or other suitable means, may be used to support the accumulator apparatus 20 in a desired position or location to enable infeeding of closures from a plurality of sorters and discharging the closures to a further utilization station such as a packaging or application station.

A plurality of air jet means including a centrally located jet means 140, a right hand jet means 150 and a left hand jet means 160 may be positioned adjacent the discharge area of the hopper to assist the rapid and orderly exit of closures. As shown in FIGS. 1 and 7 each jet means includes an air fitting block 162 secured to front cover 22. An aperture 164 formed in block 162 is aligned with an aperture 166 formed in cover 22.

Air for the jet assist is delivered to the aligned apertures 164, 166 by known tubing and connector components from a compressed air source (not shown) via a manifold 138 mounted on top cover 32. A needle valve such as shown at 168 is inserted between the manifold 138 and each air assist location to enable individual regulation of the air flow at each location.

A plurality of sensing means 170, 190 may be located on the hopper 26 (FIG. 1) to monitor the level of closures accumulated in the hopper, to measure the rate of feed of closures by each sorter, and/or to control the operation of each sorter. Each such sensing means may comprise (FIG. 6) mounting brackets 172, 174 secured to front cover 22 and back panel 24 for receiving respectively a sending cell 176 and a receiving cell 178, and holding the cells in alignment with apertures 180, 182 formed in cover 22 and panel 24.

The cell alignment enables a light beam from cell 176 to shine on cell 178, permitting the generation of a control signal in response to an interruption of the light beam by the passage of a closure or the blocking by a stack of closures in hopper 26. The control signal may then be used to monitor, measure or control as discussed in the preceding paragraph.

It should be noted that although the sensing means is shown in the form of photo cell devices, other sensing means may be substituted. For example, capacitive change detectors which generate control signals in response to the presence and/or absence of an object may be useful in certain situations.

In operation, closures are received by hopper 26 via at least two infeed chutes 12 and 14 from individual sorting or orienting devices (not shown). The closures collect between the planar surfaces of front cover 22 and back panel 24, which are spaced slightly further apart than the height of the closure side walls to maintain the closures in a single oriented layer or stack.

Because the bottom of the hopper 26 has walls that are inclined toward the vertex or discharge chute 38 of the hopper, the closures will tend to flow by gravity to the chute 38 and on to the next utilization station. However, because of the desirability and need for a higher closure discharge feeding speeds as noted hereinbefore, gravity propelled flow is inadequate. Therefore, both air jet assists and mechanical agitation or conveying means are utilized to obtain the closure flow necessary.

While either the air jet assists or the agitator/conveyor means may be used individually to gain the feeding speeds required for certain applications, the combination of the two methods blend synergistically together to provide an even higher order of both speed and orderly sequential feeding to the discharge chute for use by the high speed mechanism at the next utilization station. Moreover, closures having relatively fragile portions, such as skirts or tamper indicating bands depending from thicker side wall portions, suffer less damage and are involved in fewer mechanism jams during the orienting and feeding process when using the teachings of this invention.

To accomplish these favorable results, the air jet assists are located to help break up the bridging or arch formation over the vertex or discharge chute, that will tend to naturally occur under high speed feeding conditions, particularly when a plurality of sorters are feeding the hopper. The bridging or arch formation is also encouraged when the outer surface of the closure side walls have been provided with or have formed therein serrations, knurlings or other surface roughenings for better finger gripping of the closure when removing or replacing the closure from a container.

The air jet assist means 140 is centrally located with respect to discharge chute 38. It has aligned apertures formed in the front cover 22 and air fitting block 142 which direct an air jet downwardly and toward the center line of the discharge chute 38 to urge closures located in the vertex of the hopper 26 out of the hopper, into the chute, and in close serial relationship with preceding closures.

The closures are preferably oriented in the hopper with their open side, as defined by the side walls extending from the top thereof, toward the air jets. Thus, the air jets will have the interior of the closure side walls exposed to them, permitting the impinging air jets to exert more force on the closures to urge them in the intended direction. The volume of air in the jet may be regulated by opening or closing the needle valve 144.

The left hand air jet or assist means 160 performs similarly in urging closures, located to the left of the vertex area or discharge chute 38, toward the center line of the discharge chute where they come under the influence of the central air jet means 140.

The jet means 160 is also advantageously located with respect to the left hand slider bar 82 to best coordinate the actions of the two devices. The vertex-adjacent end of bar 82 has one or more stepped closure nesting surfaces 83 formed in the upper surface thereof. The rear portion of each nesting surface preferably has an arcuate shape that substantially conforms to the radius of curvature of the exterior side walls of the closures in the hopper 26, thereby enabling the nesting surface to engage or abut more of the closure side wall and exert more pushing force as the bar 82 is moved linearly toward the vertex on that portion of the reciprocation cycle. Thus the air jet 160 is preferably located in the path of a closure seated in a nesting surface to exert maximum force on the closure to urge it toward the center line of the discharge chute 38.

Although not shown in full detail in the drawings, in the interests of simplicity and clarity, a right hand air jet or assist means 150 includes aligned apertures formed in front cover 22 and air fitting block 152 directing an air jet to urge closures toward the center line of the discharge chute 38. The location of the air jet apertures of means 150 is also advantageously correlated with the location and operation of one or more closure nesting surfaces 53 formed in the upper surface of and on the vertex-adjacent end of right hand slider bar 52. The functions performed by bar 52/jet means 150 are substantially identical to those described hereinbefore for bar 82/jet means 160.

As an additional aid in assisting in avoiding bridging or arch formation of closures in hopper 26, a closure pattern modifier 31 may be selectively positioned on one of the inclined bottom portions of the hopper. In FIG. 1 the modifier block 31 is removably secured at the upper end of the inclined slope of the bottom-forming portion of left hand side bar 30. The modifier block causes a new stacking formation of the closures as they collect in the hopper 26.

The new formation or pattern of stacked closures will be less likely to "lock" in a bridging or arch formation that cannot be broken up by either the air jet or agitator conveyor means. The effect of a modifier block 31 can be varied by changing dimensions, such as the thickness of the block 31 and the angle of taper at the end of the block 31 which is closest to the apex of the hopper, or by changing the location or position of the block 31 along the bottom wall of the hopper.

It should be noted that the angle of the bottom of the hopper on the left side of the discharge chute is approximately 20 degrees from the horizontal, while the hopper bottom angle to the right of the discharge chute is approximately 30 degrees from the horizontal.

Figure 2:
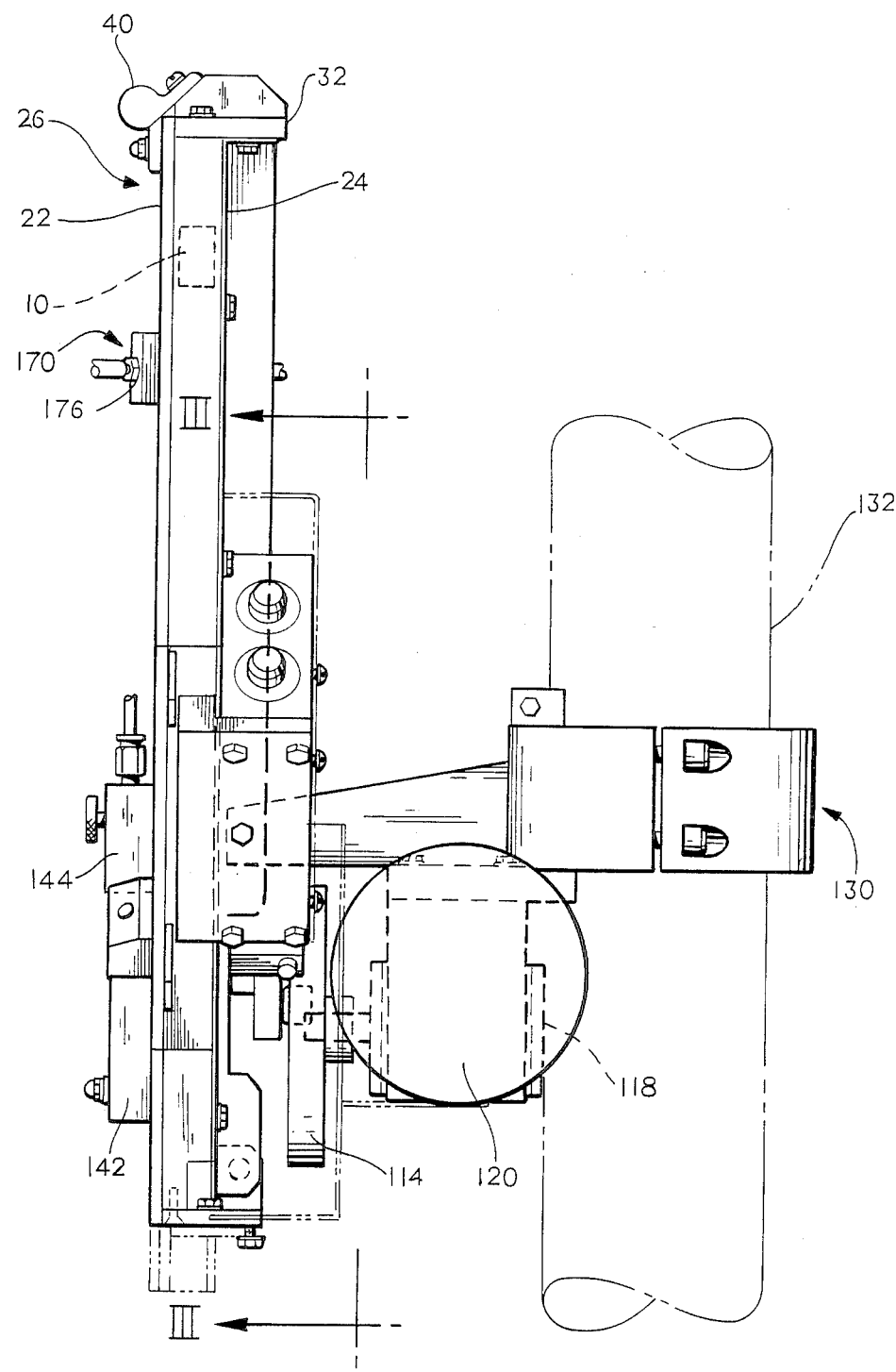
FIG. 2 is an elevational view of the right side of the apparatus illustrated in FIG. 1.

Referring now to the agitator/conveyor means 50 and 80 best seen in FIGS. 1, 2 and 3. The slide bars 52, 82 are linearly reciprocated along their respective bottom walls of the hopper 26 by motion imparted to slide bar connectors 58, 88 through movement of cam followers 70, 100. The cam surfaces 110, 112 are formed in cam block 114 so that the slide bars 52, 82 alternately approach toward and retreat from the discharge chute 38 at the vertex of the bottom of hopper 26. This alternate pushing and conveying motion of the closure nesting surfaces 53, 83 enables a substantially even flow and continuous supply of closures to the discharge chute 38.

The ends 51, 81 of the slide bars 52, 82 remote from the discharge chute 38 are tapered to enable easier, less damaging movement of the slide bars back beneath the stacked closures in hopper 26 as the bars 52, 82 move away from the chute 38. The tapers are advantageously formed at an angle which slopes away from the horizontal toward the discharge chute 38 to encourage closures resting thereon to move toward the chute 38. However, even though the tapered ends of the slide bars do not damage the closures, enough force is exerted on the stack or layer of closures to break up bridging patterns and gently agitate the layer.

It is to be understood that the form of the invention herewith shown and described is to be taken as an illustrative embodiment of the same, and that various changes in the shape, size and arrangement of the parts or in the steps of the method may be resorted to without departing from the spirit of the invention.

I claim:

1. Apparatus for improving the process of supplying closures in a predetermined oriented position and at high feed rates to a successive packaging or high speed capping application station, comprising;
    (a) means for feeding closures from a plurality of closure sorting and orienting means,
    (b) a hopper means for receiving closures from said plurality of sorting and orienting means having top, bottom and side wall means and enclosing panels spaced to maintain closures in an oriented position in a single layer,
    (c) said bottom wall having a continuously open discharge chute means formed therein which is remote from said plurality of closure feeding means, and (d) means for displacing closures in said layer from bridging and jamming patterns in said hopper means including means for positively urging closures from said layer toward and through said open discharge chute in a continuous stream at a rate faster than an individual sorting an orienting means supplies closures to said hopper means, (e) said positive urging means including first and second slide members disposed along said bottom wall of said hopper means and on opposite sides of said discharge chute means, and means for imparting reciprocal motion to said slide members toward and away from said discharge chute means which alternately moves each slide member toward said chute means while leaving said chute open.

2. Apparatus according to claim 1 wherein said displacing means includes a static pattern modifying means located within said hopper and shaped to prevent the closures from nesting together in said single layer in a regular pattern which encourages bridging and jamming of closures.

3. Apparatus according to claim 1 in which said displacing means comprises a static object positioned adjacent a wall of said hopper means, said object having dimensions that vary the internal configuration of said hopper means to prevent formation of a regular pattern by closures within said hopper means.

4. Apparatus according to claim 3 in which said object has at least two closure contacting surfaces, said contact surfaces defining an angle greater than ninety degrees.

5. Apparatus according to claim 1 in which said displacing means comprises a bottom wall means having first and second sections inclined toward and separated by said discharge chute means, the degree of inclination of each of said sections being different thereby enabling said first and second sections to cooperate in defining an internal hopper configuration which prevents formation of a regular pattern of nested closures which encourages bridging and jamming.

6. Apparatus according to claim 5 in which said first bottom wall section has an inclination of at least twenty degrees from the horizontal, and in which the inclination of said second bottom wall section is greater than that of said first bottom wall section.

7. Apparatus according to claim 1 in which said positive urging means comprises air pressure assist means positioned to urge closures out of said single layer in said hopper means toward said discharge chute means.

8. Apparatus according to claim 7 in which said air pressure assist means includes an air jet means centrally located with respect to said discharge chute means to also apply force on closures within said discharge chute means thereby assuring close sequential progression of closures in said discharge chute means.

9. Apparatus according to claim 8 in which said air pressure assist means further includes at least one additional air jet means positioned to one side of said discharge chute means for urging closures from that side of said hopper means toward said discharge chute means thereby enabling such closures to come under the influence of said centrally located air jet means.

10. Apparatus according to claim 1 in which said displacing means comprises agitating means located within said hopper means for physically disrupting said single layer of closures from a regular pattern to enable flow of closures toward said discharge chute means.

11. Apparatus according to claim 10 in which said agitating means includes a slide member and means for imparting reciprocable motion to said slide member toward and away from said discharge chute means.

12. Apparatus according to claim 11 in which said slide member has nesting surface means formed thereon shaped to abut against a closure side wall which is remote from said discharge chute means, thereby permitting said slide member nesting surface to urge a nested closure toward said discharge chute means in a conveying mode.

13. Apparatus according to claim 12 which further includes air assist means located in the path defined by travel of said nesting surface of said slide member, thereby enabling force to be applied to a closure being conveyed by said slide member to urge the closure toward said discharge chute mean while opposing movement of the closure away from said discharge chute means during travel of said slide member away from said chute means.

14. Apparatus according to claim 13 which further includes second air assist means centrally located with respect to said discharge chute means and positioned to directly urge closures into said chute means.

15. Apparatus according to claim 11 in which the end of said slide member which is remote from the discharge chute means is tapered, thereby enabling said slide member to easily move under the edge of the single layer of closures during travel of said slide member away from said discharge chute means.

16. Apparatus according to claim 10 which further includes static pattern modifying means positioned in said hopper means adjacent a wall thereof, said static means having physical dimensions which modify the internal configuration of said hopper means to prevent formation of a bridging pattern by closures within said hopper means.

17. Apparatus according to claim 10 in which said bottom wall means comprises first and second sections inclined toward and separated by said discharge chute means.

18. Apparatus according to claim 17 in which said first and second bottom wall sections have different degrees of inclination from the horizontal to define an internal hopper configuration which reduces formation of bridging patterns by said single layer of closures.

19. Apparatus acording to claim 1 which further includes sensing means for monitoring the feeding of closures to said hopper means from said plurality of sorting means and generating signal means for controlling the rate of feed of closures to said hopper means, the level of closures in said hopper means or the operation of said sorter means.

20. A method of feeding oriented closures to an operating station whose input feed requirements exceed the supply capabilities of individual sorting stations upstream of said operating station, comprising of step of:

(a) a feeding closures from a plurality of closure sorting machines, (b) collecting the output of oriented closures from said plurality of sorting machines in a single oriented layer in a hopper having an open discharge chute, and (c) displacing bridging and jamming patterns of closures in said layer to enable continuous flow of closures from said discharge chute of said hopper including the step of positively urging closures from said layer toward and through said open discharge chute in a continuous stream to an operating station at a rate faster than an individual sorting machine supplies closures to said hopper, (d) said positive urging step including alternately reciprocating first and second slide members below said layer and on opposite sides of said discharge chute toward and away from said discharge chute without blocking the chute.

21. A method according to claim 20 in which said displacing step includes agitating the closures in said hopper.

22. A method according to claim 20 in which said displacing step includes configuring the interior dimensions of the hopper to prevent formation of regular or bridging patterns of closures in said layer.

23. A method according to claim 20 in which said positive urging step includes impinging the closures in said hopper with air jets.

* * * * *